(12) United States Patent
Moulsey et al.

(10) Patent No.: US 6,668,168 B1
(45) Date of Patent: Dec. 23, 2003

(54) RADIO COMMUNICATION SYSTEM

(75) Inventors: Timothy J. Moulsey, Caterham (GB); Paul Bucknell, Brighton (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/478,468

(22) Filed: Jan. 6, 2000

(30) Foreign Application Priority Data

Jan. 16, 1999 (GB) ............................................... 9900909

(51) Int. Cl.[7] .................................................. H04Q 7/20
(52) U.S. Cl. .................... 455/434; 455/343.2; 455/515; 370/477
(58) Field of Search ................................ 455/434, 422, 455/511, 450, 453, 509, 515, 524, 343, 574, 452.2, 343.2, 3.49; 370/329, 311, 441, 336, 337, 349, 347, 437, 438, 439, 455, 459, 458, 477, 460

(56) References Cited

U.S. PATENT DOCUMENTS

| | | | | |
|---|---|---|---|---|
| 4,679,244 A | * | 7/1987 | Kawasaki et al. | 455/515 |
| 5,230,083 A | * | 7/1993 | Sasuta | 455/422 |
| 5,313,655 A | | 5/1994 | Sasuta | |
| 5,745,695 A | * | 4/1998 | Gilchrist et al. | 709/227 |
| 5,946,356 A | * | 8/1999 | Felix et al. | 375/295 |
| 6,009,325 A | * | 12/1999 | Retzer et al. | 455/434 |
| 6,052,385 A | * | 4/2000 | Kanerva et al. | 370/468 |
| 6,137,789 A | * | 10/2000 | Honkasalo | 370/342 |
| 6,272,352 B1 | * | 8/2001 | Cerwall et al. | 455/511 |
| 6,377,809 B1 | * | 4/2002 | Rezaiifar et al. | 455/455 |
| 6,456,604 B1 | * | 9/2002 | Lee et al. | 370/328 |
| 6,473,419 B1 | * | 10/2002 | Gray et al. | 370/349 |

FOREIGN PATENT DOCUMENTS

EP 0928119 A2 7/1999

* cited by examiner

Primary Examiner—Charles Appiah
(74) Attorney, Agent, or Firm—Jack D. Slobod

(57) ABSTRACT

A radio communication system has means for enabling the control channels associated with a data channel transmitting packet data with a low duty cycle to be switched to a dormant state or interrupted entirely. This reduces the excessive overhead that such control channels represent on a data channel only using a small proportion of the available channel capacity.

15 Claims, 3 Drawing Sheets

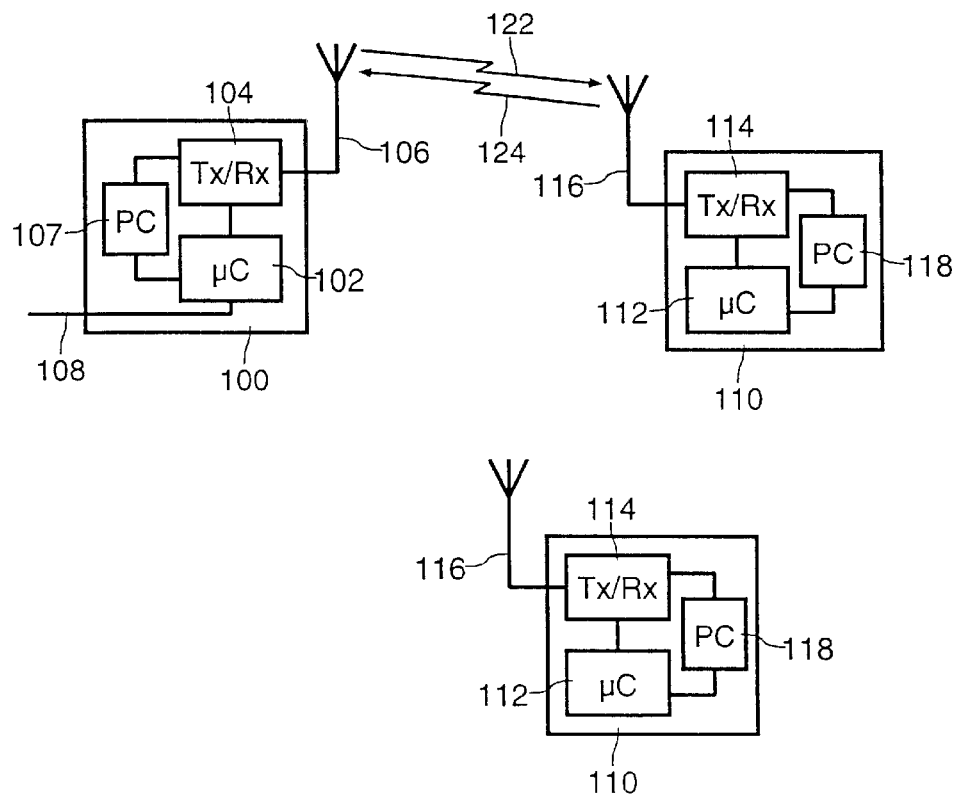
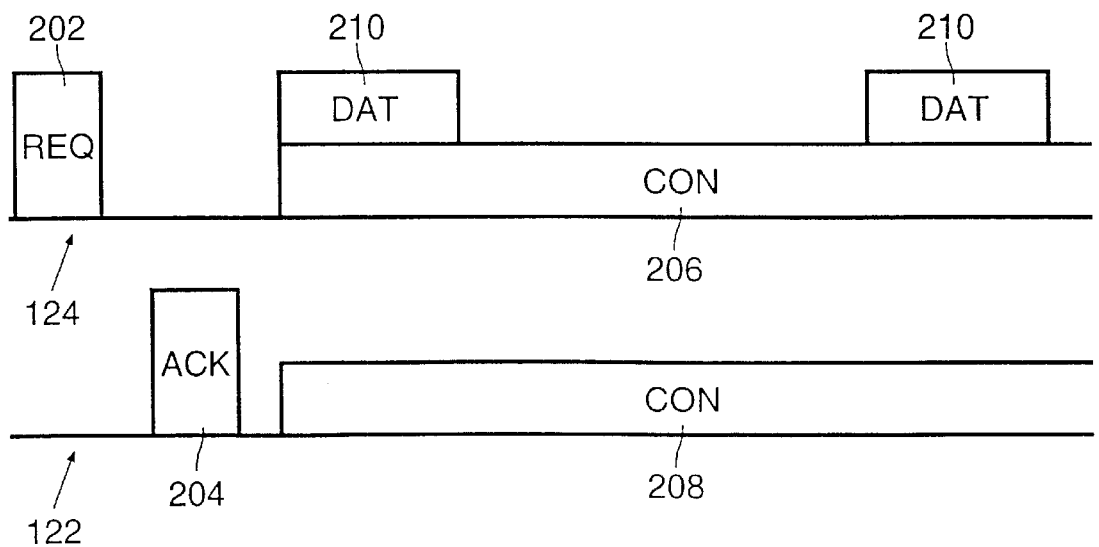
FIG. 1
FIG. 2

RADIO COMMUNICATION SYSTEM

The present invention relates to a radio communication system and further relates to primary and secondary stations for use in such a system and to a method of operating such a system. While the present specification describes a system with particular reference to the emerging Universal Mobile Telecommunication System (UMTS), it is to be understood that such techniques are equally applicable to use in other mobile radio systems.

There are two basic types of communication required between a Base Station (BS) and a Mobile Station (MS) in a radio communication system. The first is user traffic, for example speech or packet data. The second is control information, required to set and monitor various parameters of the transmission channel to enable the BS and MS to exchange the required user traffic.

In one embodiment of UMTS control channels are maintained in both directions between BS and MS once a connection has been established. This is only a relatively small overhead when speech data is being transmitted. However, in the case of packet data having a low duty cycle (i.e. intermittent transmission of packets using only a small proportion of the available channel capacity), the maintenance of bidirectional control channels represents a significant overhead.

An object of the present invention is to reduce the overhead imposed by maintaining control channels for a connection transferring data having a low duty cycle.

According to a first aspect of the present invention there is provided a radio communication system comprising a primary station and a plurality of secondary stations, the system having a communication channel between the primary station and a secondary station, the channel comprising an uplink and a downlink control channel for the transmission of control information, and a data channel for the transmission of data packets, characterised in that the primary and secondary stations have traffic reduction means for reducing traffic in the uplink and downlink control channels, and control means for activating the traffic reduction means.

According to a second aspect of the present invention there is provided a primary station for use in a radio communication system having a communication channel between the primary station and a secondary station, the channel comprising an uplink and a downlink control channel for the transmission of control information, and a data channel for the transmission of data packets, characterised in that traffic reduction means are provided for reducing traffic in the downlink control channel, and control means are provided for activating the traffic reduction means.

According to a third aspect of the present invention there is provided a secondary station for use in a radio communication system having a communication channel between the secondary station and a primary station, the channel comprising an uplink and a downlink control channel for the transmission of control information, and a data channel for the transmission of data packets, characterised in that traffic reduction means are provided for reducing traffic in the uplink control channel, and control means are provided for activating the traffic reduction means.

According to a fourth aspect of the present invention there is provided a method of operating a radio communication system comprising a primary station and a plurality of secondary stations, the system having a communication channel between the primary station and a secondary station, the channel comprising an uplink and a downlink control channel for the transmission of control information, and a data channel for the transmission of data packets, characterised by the primary and secondary stations being able to reduce traffic in the uplink and downlink control channels.

Embodiments of the present invention will now be described, by way of example, with reference to the accompanying drawings, wherein:

FIG. 1 is a block schematic diagram of a radio communication system;

FIG. 2 illustrates a conventional scheme for the transmission of packet data;

In the drawings the same reference numerals have been used to indicate corresponding features.

Figure 3:
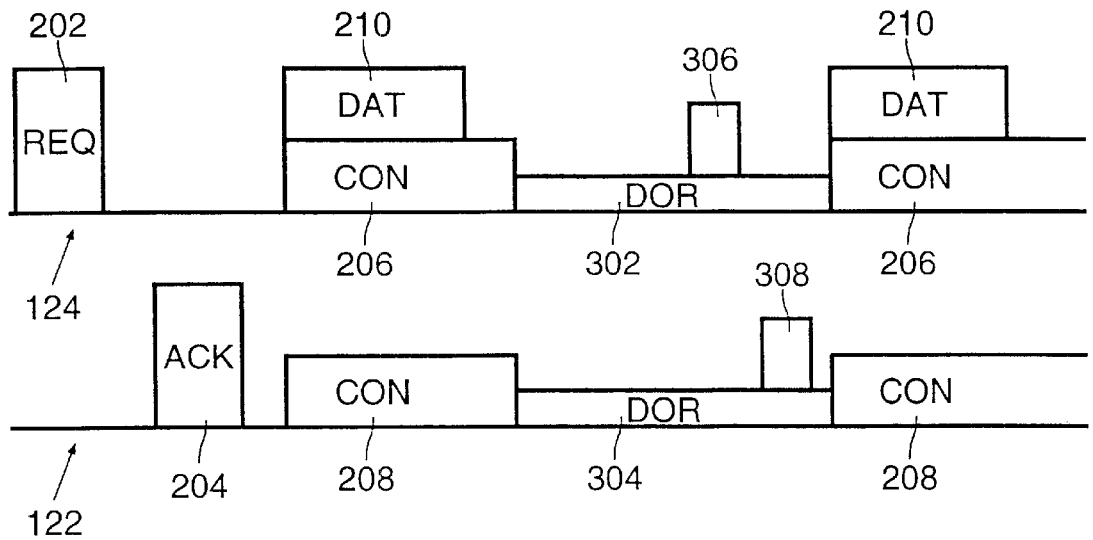
FIG. 3 illustrates a scheme in accordance with the present invention for the transmission of packet data with a control channel having a dormant state in which traffic on the control channel is reduced.

Referring to FIG. 1, a radio communication system which can operate in a frequency division duplex mode comprises a primary station (BS) 100 and a plurality of secondary stations (MS) 110. The BS 100 comprises a microcontroller ($\mu$C) 102, transceiver means (Tx/Rx) 104 connected to radio transmission means 106, power control means (PC) 107 for altering the transmitted power level, and connection means 108 for connection to the PSTN or other suitable network. Each MS 110 comprises a microcontroller ($\mu$C) 112, transceiver means (Tx/Rx) 114 connected to radio transmission means 116, and power control means (PC) 118 for altering the transmitted power level. Communication from BS 100 to MS 110 takes place on a downlink frequency channel 122, while communication from MS 110 to BS 100 takes place on an uplink frequency channel 124.

Embodiments of the present invention will be described using spread spectrum Code Division Multiple Access (CDMA) techniques, as used for example in UMTS embodiments. However, it should be understood that the invention is not limited to use in CDMA systems.

One UMTS embodiment, the frequency division duplex mode, uses the scheme of FIG. 2 for a communication link between MS 110 and BS 100. The link is initiated by the MS 110 transmitting a request 202 (REQ) for resources on the uplink channel 124. If it receives the request and has available resources, the BS 100 transmits an acknowledgement 204 (ACK) on the downlink channel 122 providing the necessary information for communication to be established. After the acknowledgement 204 has been sent, two control channels (CON) are established, an uplink control channel 206 and a downlink control channel 208.

The control channels 206, 208 include pilot, power control and rate information. The pilot information is primarily provided to allow the receiver to estimate the channel impulse response, in order to optimise detection of the received data (i.e. other information in the control channel and a data packet if present). Power control of the uplink channel 124 is required so that the BS 100 receives signals from different MS 110 at approximately the same power level, while minimising the transmission power required by each MS 110. Power control of the downlink channel 122 is required so that the MS 110 receives signals from the BS 100 with a low error rate while minimising transmission power, to reduce interference with other cells and radio systems.

Rate information provides details of the rate and transmission format of data, to enable the transceivers 104, 114 to be appropriately configured.

In the scenario illustrated in FIG. 2, the MS 110 transmits data packets 210 (DAT) with lengthy periods between them, during which periods significant resources are being used on both the uplink 124 and downlink 122 channels just to maintain control channels 206, 208. Hence the total system capacity for the transmission of user traffic is reduced. A typical duration for a data packet 210 in a UMTS system would be one frame (10ms).

An improved scheme for low duty cycle traffic, in accordance with the present invention, is shown in FIG. 3. Initiation of the link proceeds in the same manner as described above in relation to FIG. 2. In addition, the uplink 206 and downlink 208 control channels enter a dormant state 302, 304 (DOR) between transmission of data packets 210. The dormant state might for example be entered after a time-out period, or immediately after transmission of a data packet if the transmitting station can determine that no further data packets are currently available for transmission In this dormant state no rate information is transmitted (or possibly a reduced amount of rate information), and the power control rate is reduced, for example only transmitting power control information in one slot out of N. This will produce a larger error in power control than with continuous transmission. Increasing the power control step size will partly address the problem, and other methods described in our co-pending application GB 9900910.2 (our reference PHB 34314) can be applied to improve matters further. Pilot information need only be transmitted when power control bits are being transmitted. By this method the overhead of maintaining control channels 206, 208 is significantly reduced with a corresponding increase in overall system capacity. If the packet duty cycle is 10%, the overhead will be reduced by a factor of about two if N=2.

When the MS 110 has another data packet 210 to send it transmits a re-activation request 306 as part of the dormant channel (or uses alternative signalling means such as a dedicated fast signalling channel). Once the BS 100 has transmitted an acknowledgement 308 of the re-activation request 306, the normal control channels 206, 208 are re-activated and the data packet 210 can be transmitted.

A scheme similar to that described above could also be used for continuous transmission of data. Consider for example a channel that is normally used for high data rate transmissions. If this channel becomes used for transmission of data at a low data rate, the optimum rate of transmission of power control information might also be reduced. Hence, while the data continues at a low rate, the quantity of control information could be reduced in the same way as above.

Reducing the amount of power control information transmitted usually requires the data channel to be transmitted at a higher power to maintain the same quality of service. However, for a low data rate transmission the increased power required for the data transmission could be more than offset by the reduction in the transmission of control information.

Figure 4:
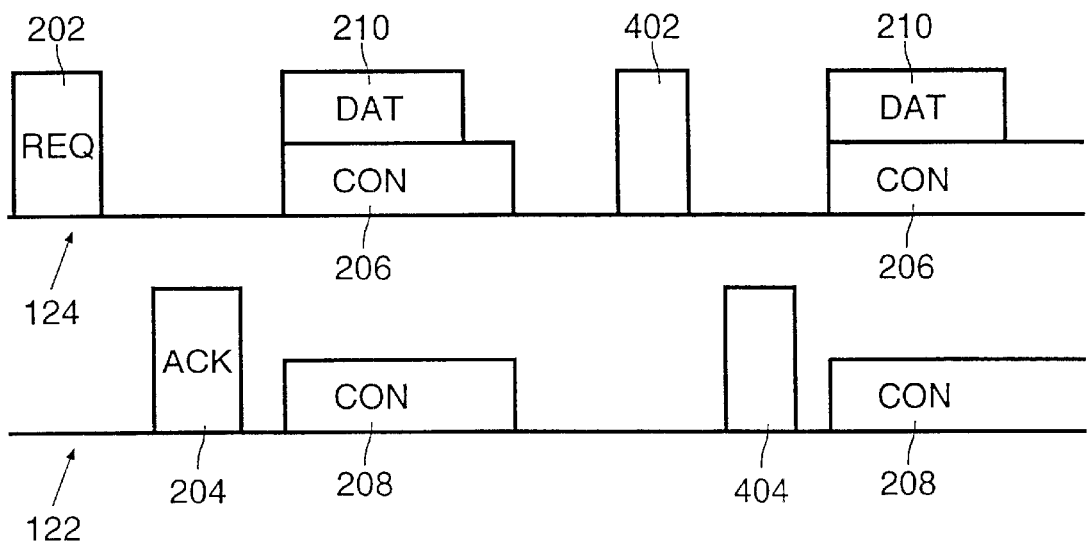
FIG. 4 illustrates a scheme in accordance with the present invention for the transmission of packet data with an interruptible control channel.

An alternative scheme, in which the control channel is interrupted completely, for example after a suitable time-out period, is shown in FIG. 4. This scheme completely removes the overhead of the control channels 206, 208 between transmission of data packets 210. However, re-activation of the control channels 206, 208 can be done with specific signalling. This is illustrated as a re-activation request 402 from the MS 110, transmitted for example on a dedicated fast signalling channel, followed by an acknowledgement 404 by the BS, after which the control channels 206, 208 are re-established and data packets 210 can be transmitted.

In practice it may not be necessary for there to be an explicit acknowledgement 404 for reactivation of the control channels 206, 208. For example, if the downlink control channel 208 uses the same spreading codes after interruption as before interruption, the BS 100 could reactivate the channel by simply starting to transmit it again, which transmission would be detected by the MS 110 which could then begin transmission of the uplink control channel 206. Similarly, the MS 110 could request re-activation by starting transmission of the uplink control channel 206. The same approach could also be used for re-activation from the dormant state.

If the communication system employs CDMA techniques, the control channels 206, 208 may be transmitted with a different spreading factor to the data transmissions 210. In this case satisfactory quality estimates for use in power control might not be able to be derived accurately from the control channels 206, 208 alone, and complete interruption of them would not have any additional impact on power control.

Figure 5:
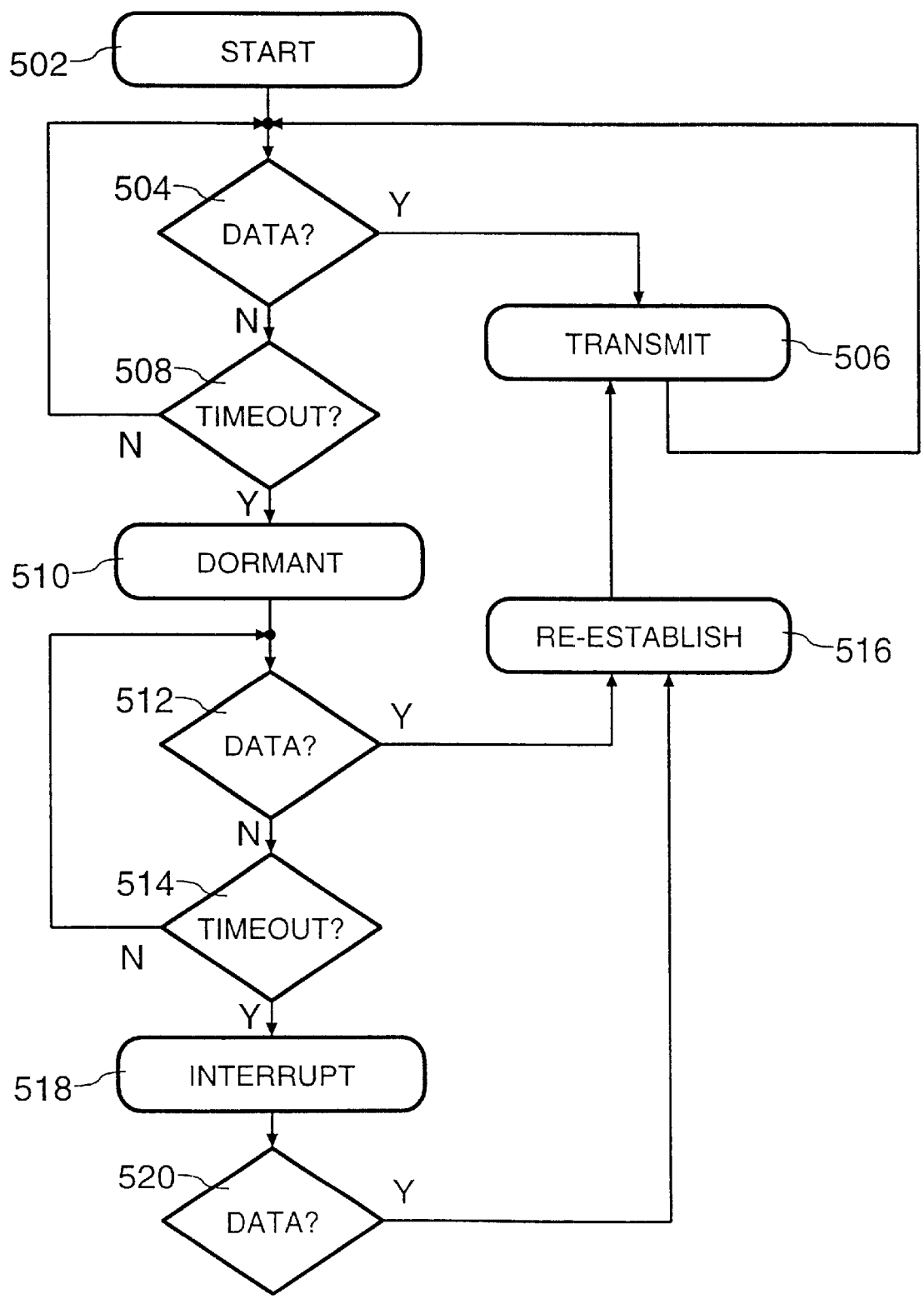
FIG. 5 is a flow chart illustrating a method in accordance with the present invention for utilising a control channel having dormant and interrupted states.

The use of dormant and interrupted control channels may be combined. A method of using dormant and interrupted control channels for the transmission of data packets is shown as a flow chart in FIG. 5. The method starts at 502 with the establishment of a communication link between the MS 110 and BS 100. The MS 110 then determines at 504 whether it has any data packets 210 to transmit. If it has they are transmitted 506. When no more data packets 210 remain to be transmitted the MS 110 determines at 508 whether a first time-out period since transmission of the last data packet 210 has been reached. If it has, the control channels 206, 208 enter their dormant state at 510.

The MS 110 checks, at 512, whether any data packets 210 are waiting for transmission. If any are waiting, the control channels 206, 208 are re-established at 516, and the data packets are transmitted 506. If there are no waiting data packets 210, the MS 110 determines at 514 whether a second time-out period since transmission of the last data packet 210 has been reached. If it has, transmission of the dormant control channels 302, 304 is interrupted. The MS 110 then waits at 520 until one or more data packets 210 are waiting for transmission, when it re-establishes the control channels at 516 and transmits the data packets at 506.

The time-out periods should preferably be chosen to be short enough to save resources, but not so short that frequent transitions between normal, dormant and interrupted states are needed. A suitable choice could be between 5 and 10 frames for the first time-out 508, and a similar period for the second time-out 514.

Although the description above has examined data transmission on the uplink channel 124, the techniques are equally applicable to data transmission on the downlink channel 122 or to bidirectional transmissions. In this latter case the preferred solution would be to reset the time-out period on packet transmission in either the uplink or downlink data channel. Although in principle the control channel state (i.e. normal, dormant or interrupted) could be different in the uplink 124 and downlink 122 channels, there seems to be no advantage in allowing this.

Further, the present invention is not restricted to use in a frequency division duplex system. All that is required is for uplink and downlink communication paths to be available. It could, for example, be used in a time division duplex system, although the power control rate in such a system would normally be limited to once per transmission burst.

From reading the present disclosure, other modifications will be apparent to persons skilled in the art. Such modifications may involve other features which are already known in radio communication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

What is claimed is:

1. A radio communication system, comprising:
   a primary station;
   a secondary station;
   a data channel for a plurality of data transmissions between said primary station and said secondary station; and
   an uplink control channel and a downlink, control channel for a plurality of control information transmissions between said primary station and said secondary station,
   wherein, subsequent to a first data transmission on said data channel, said uplink control channel and said downlink control channel enter into a dormant state after a first time period has elapsed without a second data transmission on said data channel,
   wherein a first control information is transmitted on said uplink control channel and said downlink control channel during the first data transmission on said data channel, and a second control information is transmitted on said uplink control channel and said downlink control channel when said uplink control channel and said downlink control channel are entered into the dormant state, wherein a first amount of the first control information is greater than a second amount of the second control information.

2. The radio communication system of claim 1, wherein, subsequent to said uplink control channel and said downlink control channel entering into the dormant state, said uplink control channel and said downlink control channel enter into an interrupted stare after a second time period has elapsed without the second data transmission on said data channel.

3. The radio communication system of claim 1, wherein, in response to said uplink control channel and said downlink control channel entering into the dormant state, the second control information is transmitted on said uplink control channel and said downlink control channel in one out of every N available slots, N being an integer greater than 1.

4. The radio communication system of claim 1, wherein said data channel is a data uplink channel.

5. A primary station, comprising:
   means or utilizing a data channel for a plurality of data transmissions between said primary station and a secondary station;
   means for utilizing a downlink control channel for a plurality of control information transmissions between said primary station and the secondary station; and
   means for, subsequent to a first data transmission on said data channel, entering said downlink control channel into a dormant state after a first time period has elapsed without a second data transmission on said data channel,
   wherein a first control information is transmitted on said downlink control channel during the first data transmission on said data channel, and a second control information is transmitted on said downlink control channel when said downlink control channel is entered into the dormant state, wherein a first amount of the first control information is greater than a second amount of the second control information.

6. The primary station of claim 5, wherein, subsequent to said downlink control channel entering the dormant state, said downlink control channel enters into an interrupted state after a second time period has elapsed without the second data transmission on said data channel.

7. The primary Station of claim 5, wherein, in response to said downlink control channel entering into the dormant state, the second control information is transmitted on said downlink control channel in one out of every N available slots, N being an integer greater than 1.

8. The primary station of claim 5, wherein said data channel is an uplink data channel.

9. A secondary station, comprising:
   means for utilizing a data channel for a plurality of data transmissions between said secondary station and a primary station;
   means for utilizing an uplink control channel for a plurality of control information transmissions between said second station and the primary station; and
   means for, subsequent to a first data transmission of said data channel, entering said uplink control channel into a dormant state after a first time period has elapsed without a second data transmission on said data channel,
   wherein a first control information is transmitted an said uplink control channel during the first data transmission on said data channel, and a second control information is transmitted on said uplink control channel when said uplink control channel is entered into the dormant state, wherein a first amount of the first control information is greater than a second amount of the second control information.

10. The secondary station of claim 9, wherein, subsequent to said uplink control channel entering the dormant state, said uplink control channel enters into an interrupted state after a second time period has elapsed without the second data transmission on said data channel.

11. The secondary station of claim 9, wherein, in response to said uplink control channel entering into the dormant state, the second control information is transmitted on said uplink control channel in one out of every N available slots, N being an integer greater than 1.

12. The secondary station of claim 9, wherein said data channel is a uplink data channel.

13. A method of operating a radio communication system including a primary station and a secondary station, the method comprising:
   establishing a data channel for a plurality of data transmissions between the primary station and The secondary station; and
   establishing an uplink control channel and a downlink control channel for a plurality of control information transmissions between the primary station and the secondary station; and
   subsequent to a first data transmission on the data channel, entering the uplink control channel and the downlink control channel into a dormant state after a first time period has elapsed without a second data transmission on the data channel,
   wherein a first control information is transmitted on the uplink control channel and the downlink control channel daring the first data transmission, and a second control information is transmitted on the uplink control channel and the downlink control channel when the uplink control channel and the downlink control channel are entered into the dormant state, wherein a first amount of the first control information is greater than a second amount of the second control information.

14. The method of claim 13, further comprising:

subsequent to the uplink control channel and the downlink control channel entering the dormant state, entering the uplink control channel and the downlink control channel into an interrupted state after a second time period has elapsed without the second data transmission on the data channel.

15. The method of claim 13, further comprising:

in response to the uplink control channel and the downlink control channel entering the dormant state, transmitting control information on the uplink control channel and the downlink control channel in one out of every N available slots, N being an integer greater than 1.

* * * * *